United States Patent
Roodenburg et al.

(10) Patent No.: US 10,392,869 B2
(45) Date of Patent: Aug. 27, 2019

(54) MARINE DRILLING RISER JOINT

(71) Applicant: ITREC B.V., Schiedam (NL)

(72) Inventors: Joop Roodenburg, Schiedam (NL);
Diederick Bernardus Wijning, Schiedam (NL)

(73) Assignee: ITREC B.V., Schiedam (NL)

( * ) Notice: Subject to any disclaimer, the term of this patent is extended or adjusted under 35 U.S.C. 154(b) by 213 days.

(21) Appl. No.: 15/520,882

(22) PCT Filed: Oct. 22, 2015

(86) PCT No.: PCT/NL2015/050729
§ 371 (c)(1),
(2) Date: Apr. 21, 2017

(87) PCT Pub. No.: WO2016/064271
PCT Pub. Date: Apr. 28, 2016

(65) Prior Publication Data
US 2017/0335634 A1    Nov. 23, 2017

(30) Foreign Application Priority Data

Oct. 22, 2014  (NL) ...................................... 2013665

(51) Int. Cl.
| | |
|---|---|
| *E21B 17/01* | (2006.01) |
| *E21B 19/16* | (2006.01) |
| *E21B 17/08* | (2006.01) |
| *E21B 7/12* | (2006.01) |
| *F16L 55/00* | (2006.01) |

(52) U.S. Cl.
CPC .......... *E21B 17/012* (2013.01); *E21B 17/085* (2013.01); *E21B 19/16* (2013.01); *E21B 7/12* (2013.01); *F16L 55/00* (2013.01)

(58) Field of Classification Search
CPC ....... E21B 17/012; E21B 17/085; E21B 19/16
See application file for complete search history.

(56) References Cited

U.S. PATENT DOCUMENTS

| | | | | |
|---|---|---|---|---|
| 277,374 | A | * | 5/1883 | Strohm ................. H01B 3/082 174/111 |
| 4,249,610 | A | * | 2/1981 | Loland .................. E21B 17/012 166/352 |

(Continued)

FOREIGN PATENT DOCUMENTS

WO    WO 2012/082779 A2    6/2012

*Primary Examiner* — Matthew R Buck
(74) *Attorney, Agent, or Firm* — Birch, Stewart, Kolasch & Birch, LLP (57) ABSTRACT

The present invention relates to a marine drilling riser joint, adapted for the securement of one or more umbilicals (36) thereto. The marine drilling riser joint comprises one or more umbilical gutter assemblies (8), connected to or formed integral in an outer surface of a buoyancy module on the exterior of the marine drilling riser joint and provided parallel to the riser pipe, the umbilical gutter assembly comprising: an umbilical gutter (8) adapted to accommodate one or more umbilicals; and a resilient gutter cover (82a, 82b), which is elastically deformable by a loom tool, which resilient gutter cover in a closed position covers the umbilical gutter and in an elastically deformed position provides a working clearance to allow the one or more umbilicals to be introduced into the umbilical gutter.

14 Claims, 5 Drawing Sheets

(56) References Cited

U.S. PATENT DOCUMENTS

| | | | | |
|---|---|---|---|---|
| 4,477,207 | A | * | 10/1984 | Johnson .................... F16L 1/24 166/350 |
| 4,596,531 | A | | 6/1986 | Schawann et al. |
| 5,330,294 | A | * | 7/1994 | Guesnon ............... E21B 17/012 166/350 |
| 6,155,748 | A | * | 12/2000 | Allen .................... E21B 17/012 114/230.13 |
| 6,375,017 | B1 | * | 4/2002 | Schattner ............ A61M 5/1418 211/70 |
| 6,948,884 | B2 | * | 9/2005 | Xu .......................... E21B 17/01 405/211 |
| 7,100,694 | B2 | * | 9/2006 | Legras .................... E21B 17/01 166/350 |
| 7,441,602 | B2 | * | 10/2008 | Saint-Marcoux ....... E21B 17/01 166/302 |
| 8,256,993 | B2 | * | 9/2012 | Branchut ................ E21B 17/01 166/350 |
| 8,540,029 | B2 | * | 9/2013 | McMiles ................. E21B 17/01 166/345 |
| 9,022,827 | B2 | * | 5/2015 | Snyder, II ................. F16L 1/24 441/133 |
| 2012/0247782 | A1 | * | 10/2012 | Smith .................. E21B 17/012 166/350 |

\* cited by examiner

MARINE DRILLING RISER JOINT

The present application generally relates to subsea drilling operations. More particularly, the present application relates to a marine drilling riser joint, adapted for the securement of one or more umbilicals thereto. The invention furthermore relates to the combination of a marine drilling riser joint and a loom tool, an offshore vessel comprising riser joints and a method for attaching one or more umbilicals to a riser joint.

Offshore oil and natural gas drilling and production, particularly in deep water, relies on substantially vertical conduits called marine risers to convey fluids and slurries between the seabed and the surface, including but not limited to, drilling risers, production risers, export risers, steel catenary risers ("SCRs"), and flexible composite flowlines. Risers are made up of riser joints, having a length of typically 75 feet, which are typically deployed with a lower marine riser package (LMRP)/blow out preventer (BOP) stack.

Some marine risers, such as SCRs, may include a single conduit, while other risers, such as marine drilling risers, may include a larger diameter main conduit, the riser pipe, with a plurality of attached, smaller diameter auxiliary or peripheral lines. These auxiliary lines, also referred to as 'satellite pipes', are e.g. used as fluid lines to a BOP or other subsea equipment. The auxiliary lines e.g. comprise choke and kill lines, booster lines, injection lines (e.g. for glycol) and hydraulic supply and control lines.

Marine drilling risers joints are rigid riser joints utilised during drilling and workover operations. Interconnected marine drilling riser joints form a marine drilling riser string, also simply referred to as marine drilling riser. The major functions of a marine drilling riser are to provide fluid transportation to and from the well; support auxiliary lines, guide tools, and drilling strings; serve as a running and retrieving string for the BOP. Marine drilling risers may also be used for well completion and testing.

Typically a marine drilling riser may be at least partially supported by floatation of one form or another, including buoyancy modules made from, for example, synthetic foam material. Buoyancy modules may be arranged circumferentially around the riser pipe of a marine drilling riser and run along a length thereof from the surface down to the seafloor.

Drilling umbilicals, e.g. electrical or fiber optic control umbilicals are required to be deployed with the marine riser. For example, an installation and workover control system (IWOCS) is applied in connection with subsea drilling umbilicals. Generally, the IWOCS umbilical is a means for providing electro-hydraulic control to a subsea tree during tree installation, well completion, and well workover activities.

Conventional methods involve clamping the one or more umbilicals directly to each joint of marine drilling riser when the riser is deployed. Clamping the umbilical to a marine drilling riser joint requires approximately ten minutes per marine drilling riser joint to install clamps, which represents a delay to the critical path operation. For example, in 7,000 feet water depth, approximately 16 hours of rig time per riser trip is required for installing clamps.

Additionally, if an umbilical or termination assembly malfunctions for any reason, the entire marine riser, BOP and/or LMRP must be recovered from the ocean floor to the rig surface to access and repair the umbilical. Such recovery is very time consuming and expensive, as it requires substantial work and time for recovery operations.

Therefore, a need has existed for many years for a process to effectively and efficiently attach and de-couple the one or more umbilicals from the marine drilling riser joint.

In WO2012/082779 methods are disclosed for deploying and/or retrieving an umbilical independent from a marine drilling riser in connection with offshore drilling. A method is disclosed comprising the steps of deploying a marine drilling riser from the drilling vessel into the ocean, deploying the umbilical from the drilling vessel into the ocean, whereby the umbilical is deployed independently from the marine drilling riser, and securing the umbilical to the drilling riser with one or more guide structures.

According to the present invention, an alternative marine drilling riser joint is proposed, adapted for the securement of one or more umbilicals thereto, the riser joint comprising:
  a riser pipe;
  one or more peripheral lines extending parallel to the riser pipe;
  one or more buoyancy modules arranged circumferentially around the riser pipe;
  connector fitting arrangements at each end thereof;

According to the present invention, the marine drilling riser joint further comprises one or more umbilical gutter assemblies, connected to or formed integral in an outer surface of a buoyancy module on the exterior of the marine drilling riser joint and provided parallel to the riser pipe, the umbilical gutter assembly comprising:
  an umbilical gutter adapted to accommodate one or more umbilicals; and
  a resilient gutter cover, which is elastically deformable by a loom tool, which resilient gutter cover in a closed position covers the umbilical gutter and in an elastically deformed position provides a working clearance to allow the one or more umbilicals to be introduced into the umbilical gutter.

The marine drilling riser joint of the invention comprises a riser pipe, also called the main pipe or main conduit. Conventionally, such joints have a length between 30 ft. (9.14 meters), 50 ft. (15.24 meters) and 90 ft. (27.43 meters). A very common length for riser joints is 75 ft. (22.86 meters). It is conceivable that drilling riser joints occasionally have a substantially smaller length, also called "pup joints", to ensure proper space-out, and on the other hand also drilling riser joints having a length of up to 150 feet or even longer are conceivable as well.

The marine drilling riser joint of the invention furthermore comprises one or more peripheral lines, also called auxiliary or satellite lines, extending parallel to the riser joint. Such peripheral lines preferably include, but are not limited to, choke and kill lines (sometimes together referred to as the 'p-lines'), boost or booster lines, and hydraulic lines.

Each marine drilling riser joint comprises a connector fitting arrangement at each end thereof. For example the connector fitting arrangement includes a flange having bolt holes, with marine drilling riser joints being joined by interconnecting flanges by means of bolts and nuts. A satellite pipe may have an individual connector fitting, e.g. a bayonet fitting, or be designed to fit sealingly into the satellite pipe of an adjoining marine drilling riser joint without direct axial securing of the satellite pipes.

Furthermore, one or more buoyancy modules are arranged circumferentially around the marine drilling riser joint, providing buoyancy to the drilling riser joint. Drilling risers typically have synthetic foam buoyancy modules, e.g. HDPE. A buoyancy modules may comprise multiple buoyancy elements which are assembled around or coupled to the main riser. In an embodiment, a buoyancy module may include two "clamshell" longitudinal half-cylinder buoyancy elements that are clamped around the main conduit. A buoyancy module preferably has molded-in grooves at the inner surface, recesses and holes to accommodate attachment hardware and auxiliary lines. Other buoyant material or configurations for buoyancy modules are conceivable as well. A common length of a buoyancy module is 5-20 feet, hence, a riser joint commonly comprises multiple buoyancy modules. The size and material of a buoyancy module may be varied to achieve different buoyancy.

According to the invention, connected to or formed integral in an outer surface of these buoyancy modules, are one or more umbilical gutter assemblies, provided on the exterior of the marine drilling riser joint and provided parallel to the riser pipe. A single umbilical gutter assembly may extend along a string of riser joint assemblies, but it is also conceivable that two or even more umbilical gutter assemblies are provided. Accordingly, one or more umbilical gutter assemblies may be provided on each module. It is conceivable that a single loom tool is capable of deforming resilient gutter covers of multiple umbilical gutter assemblies. Yet alternatively, each umbilical gutter assembly is provided with an accompanying loom tool.

An umbilical gutter assembly according to the invention comprises an umbilical gutter adapted to accommodate one or more umbilicals, and a resilient gutter cover. In embodiments, an umbilical gutter is dimensioned to accommodate two adjacent umbilicals. The resilient gutter cover of the invention is elastically deformable by a loom tool, which resilient gutter cover in a closed position covers the umbilical gutter and in an elastically deformed position provides a working clearance to allow the one or more umbilicals to be introduced into the umbilical gutter.

In embodiments, the resilient gutter cover is of a self-closing type, and hence closes back to the closed position by itself, after having been deformed by the loom tool. In alternative embodiments, e.g. the loom tool assists in closing the resilient gutter cover to the closed position.

In the closed position of the resilient gutter cover an elongated end portion of the resilient gutter cover may be allowed to rest on an outer surface of a buoyancy module. Alternatively, parts of the gutter cover may be allowed to overlap. In yet alternative embodiments, a closing mechanism may be provided, such as a tongue and groove.

It is conceivable that the resilient gutter cover is formed integral with the umbilical gutter. Hence, the umbilical gutter and the resilient gutter cover are made in one piece. Alternatively, the umbilical gutter and the resilient gutter cover are made out of two or more components. The umbilical gutter is not necessarily resilient, but in view of the choice of material for a one piece umbilical gutter assembly this is an option. In alternative embodiments, it is conceivable that the umbilical gutter and the resilient gutter cover are separate components, each individually connected to the buoyancy module. The umbilical gutter and/or the resilient gutter cover may be of a two- or multiple-piece construction. In embodiments, for example, the resilient gutter cover is composed of overlapping cover portions.

In embodiments, the umbilical gutter assembly is dimensioned to accommodate the one or more umbilicals, preferably one umbilical, under friction. Preferably, the friction of the umbilical gutter is sufficient to carry the weight of the one or more umbilicals. Preferably, at least the umbilical gutter is made of material that causes friction with the umbilical. Preferably, the dimension of the umbilical gutter essentially corresponds to that of the umbilical to cause friction. In embodiments, the umbilical gutter is provided with a resilient padding. In addition, it is noted that umbilicals are generally quite delicate devices. Hence, preferably the umbilical gutter is resilient in some extent.

The resilient gutter cover is preferably made of a resilient material, such as an elastomer, which is optionally fibre-reinforced. It is conceivable that the gutter cover is embodied as a single 'flap'. In embodiments the gutter cover comprises two possibly overlapping flaps covering the gutter. It is advantageous, but not a prerequisite, that the resilient gutter cover covers the umbilical gutter in its entirety. Hence, it is conceivable that an open slit is present adjacent the gutter cover.

The umbilical gutter assembly may be connected to the outer surface of a buoyancy module. In general, this may be a delicate location for riser joints as the gutter assemblies form protrusions susceptible to damage during storage and handling.

In advantageous embodiments, the outer surface of a buoyancy module is provided with a groove, parallel to the riser pipe. This allows the umbilical gutter assembly to be provided at least partially recessed in the module. In embodiments, the groove forms the umbilical gutter, and a resilient gutter cover is connected to or formed integral in the buoyancy module. Alternatively, at least the umbilical gutter of the umbilical gutter assembly is connected to or formed integral in the groove.

In embodiments wherein the groove in the module forms the umbilical gutter, or wherein the umbilical gutter in its entirety is connected to or formed integral in the groove of the buoyance module, it is possible to provide the resilient gutter cover in undeformed position flush with the outer surface of the module. Hence, the resilient gutter cover in the closed position covers the groove and is provided flush with the outer surface of the buoyancy module. This is advantageous in view of riser handling, a riser having less protrusions being less vulnerable to damage, and during operation, as the one or more umbilicals do not extend outside the contour of the marine drilling riser joint. Furthermore, part of the length of the umbilicals in the umbilical gutter assembly is protected by the gutter cover. It is noted that other parts of the length of the umbilicals, between the modules and between the riser joints, may be exposed nevertheless.

Modules, in particular buoyancy modules, are generally moulded products. In order to obtain an improved connection between the umbilical gutter assembly and the module, it is advantageous to provide the umbilical gutter and/or resilient gutter cover during moulding, and as such integrate the umbilical gutter and/or resilient gutter cover in the moulded product. Advantageously, the umbilical gutter and/or resilient gutter cover is provided with one or more anchoring protrusions to improve the connection between the moulded buoyancy module, and wherein the umbilical gutter and/or resilient gutter cover is moulded integral with the buoyancy module.

The marine drilling riser joints of the invention are assembled into a drilling riser string. During or after the assembly of the drilling riser joints, the one or more umbilicals may be secured to the marine drilling riser joints, in particular accommodated into the umbilical gutters on the outer surface of the buoyancy modules. In operation, the one or more umbilicals are allowed to run along the length of the riser joints.

As indicated above, the marine drilling riser joint of the invention allows the attachment and decoupling of the one or more umbilicals from the drilling riser joint effectively and efficiently.

This is achieved in particular by the combination of the marine drilling riser joint of claim 1 with a resilient gutter cover and a loom tool which is adapted to elastically deform a section of the resilient gutter cover and provide a working clearance for the one or more umbilicals to be introduced into the umbilical gutter.

Hence, the loom tool is able to locally deform the resilient gutter cover and thus open the gutter assembly, providing a working clearance that allows the one or more umbilicals to locally access the umbilical gutter and to be removed from the umbilical gutter. As only a section of the resilient gutter cover is deformed, the one or more umbilicals are allowed to access only a section of the umbilical gutter, below the elastically deformed section of the gutter cover. As such, the loom tool and resilient gutter cover operate as a type of zipper, that can be locally unzipped to allow the one or more umbilicals to be introduced into or removed from the umbilical gutter.

Generally, a vessel is provided with one or more umbilical reels comprising one or more umbilicals. The umbilicals are unreeled from their storage reel in a horizontal direction towards the riser string, and then guided over a guide reel (provided adjacent the riser string) to change the direction from horizontal to vertical to be lowered with the riser string, and according to the invention secured to the riser joint.

As both the umbilical guide reel and the loom tool are provided adjacent the umbilical and the marine drilling riser joint, in particular the umbilical gutter assembly, in embodiments the umbilical guide reel and loom tool may be formed integral. Alternatively, the umbilical guide reel and the loom tool are provided as separate components. In embodiments comprising two umbilical reels and two umbilical gutters provided on a marine drilling riser joint, preferably two umbilical guide reels and two loom tools are provided.

In embodiments, the umbilical guide reel and/or the loom tool are provided movable, capable to clear the firing line into which the drilling riser string is launched, e.g. to allow the lowering of a riser spider or telescopic riser joint. For example, the umbilical guide reel and/or loom tool is provided on horizontal rails, to be able to translate away from the firing line.

The effect of this local deformation is that it is not only possible to allow the one or more umbilicals to be introduced into or removed from the umbilical gutter above water level, upon preparing the riser string, but also after having deployed the umbilicals and the riser string into the water. Above water level, the loom tool may be provided on a drilling vessel, below the drill floor. Below water level, for example an ROV is provided with the loom tool. Advantageously, the umbilical gutter assembly serves as an ROV guide along the riser string.

With the marine drilling riser joint of the invention it is possible to locally remove the one or more umbilicals from the riser string for local inspection and/or maintenance purposes. Furthermore, it is possible to allow the introduction of an additional umbilical into the umbilical gutter during operation, or analogously, to remove umbilicals from the umbilical gutter during operation, possibly while maintaining another umbilical in the gutter.

The present invention also relates to a marine drilling riser joint, adapted for the securement of one or more umbilicals thereto, the riser joint comprising:

a riser pipe;
one or more peripheral lines extending parallel to the riser pipe;
two or more fins arranged circumferentially around the riser pipe and provided parallel to the riser pipe;
connector fitting arrangements at each end thereof;

characterized in that the marine drilling riser joint further comprises one or more umbilical gutter assemblies, connected to or formed integral in an outer surface of a fin, the umbilical gutter assembly comprising:

an umbilical gutter adapted to accommodate one or more umbilicals; and
a resilient gutter cover, which is elastically deformable by a loom tool, which resilient gutter cover in a closed position covers the umbilical gutter and in an elastically deformed position provides a working clearance to allow the one or more umbilicals to be introduced into the umbilical gutter.

Marine drilling riser strings are built up out of multiple drilling riser joints. In many practical embodiments a marine drilling riser joint is provided with one or more buoyancy and/or thermal insulation members, e.g. of foam material, but so-called bare joints are also employed, deprived from buoyance modules. Such drilling riser joints may be provided with two or more fins. The purpose of the fins may be to protect the riser and auxiliary lines. Additionally, these fins may also increase the buoyancy of the riser joint. Furthermore, such marine drilling riser joints with fins provided with umbilical gutter assemblies allow the provision of one or more umbilicals over an entire drilling riser string, which string may comprise both drilling riser joints with buoyance elements and drilling riser joints without buoyance elements, but with fins.

The invention further relates to an offshore drilling vessel adapted to perform subsea wellbore related operations involving the building of riser string between the subsea wellbore and the vessel, comprising:

a hull,
a riser storage adapted to store a number of marine drilling riser joints according to claim 1, each marine riser joint comprising
a riser pipe;
one or more peripheral lines extending parallel to the riser pipe;
one or more buoyancy modules arranged circumferentially around the riser pipe;
connector fitting arrangements at each end thereof;
one or more umbilical gutter assemblies, connected to or formed integral in an outer surface of a buoyancy module on the exterior of the marine drilling riser joint and provided parallel to the riser pipe, the umbilical gutter assembly comprising:
an umbilical gutter adapted to accommodate one or more umbilicals; and
a resilient gutter cover, which is elastically deformable by a loom tool, which resilient gutter cover in a closed position covers the umbilical gutter and in an elastically deformed position provides a working clearance to allow the one or more umbilicals to be introduced into the umbilical gutter;
one or more umbilicals;
a loom tool adapted to elastically deform a section of the resilient gutter cover and provide a working clearance for the one or more umbilicals to be introduced into the umbilical gutter.

In embodiments, the vessel is provided with a riser handling capacity hoisting device having a riser hanger device, which is adapted to raise and lower a riser string that is suspended from said riser hanger device. In such embodiments, the loom tool is advantageously provided adjacent the riser hanger device.

In embodiment, the vessel is provided with an ROV (remotely operable vehicle) comprising the loom tool. The ROV is allowed to enter the water and perform subsea operations, including the introduction of or removal from one or more umbilicals.

The invention further relates to a method for attaching one or more umbilicals to a riser joint, comprising the steps of:
providing a marine drilling riser joint according to claim 1, comprising :
a riser pipe;
one or more peripheral lines extending parallel to the riser pipe;
one or more buoyancy modules arranged circumferentially around the riser pipe;
connector fitting arrangements at each end thereof;
one or more umbilical gutter assemblies, connected to or formed integral in an outer surface of a buoyancy module on the exterior of the marine drilling riser joint and provided parallel to the riser pipe, the umbilical gutter assembly comprising:
an umbilical gutter adapted to accommodate one or more umbilicals; and
a resilient gutter cover, which is elastically deformable by a loom tool, which resilient gutter cover in a closed position covers the umbilical gutter and in an elastically deformed position provides a working clearance to allow the one or more umbilicals to be introduced into the umbilical gutter;
providing one or more umbilicals;
lowering the drilling riser joint into the sea,
lowering the one or more umbilicals into the sea,
providing and operating a loom tool to elastically deform a section of the resilient gutter cover and provide a working clearance, allowing the one or more umbilicals to be introduced into the umbilical gutter.

The invention further relates to a method of removing one or more umbilicals from a riser joint, comprising the steps of:
providing a marine drilling riser string comprising:
one or more marine drilling riser joints according to claim 1, comprising :
a riser pipe;
one or more peripheral lines extending parallel to the riser pipe;
one or more buoyancy modules arranged circumferentially around the riser pipe;
connector fitting arrangements at each end thereof;
one or more umbilical gutter assemblies, connected to or formed integral in an outer surface of a buoyancy module on the exterior of the marine drilling riser joint and provided parallel to the riser pipe, the umbilical gutter assembly comprising:
an umbilical gutter adapted to accommodate one or more umbilicals; and
a resilient gutter cover, which is elastically deformable by a loom tool, which resilient gutter cover in a closed position covers the umbilical gutter and in an elastically deformed position provides a working clearance to allow the one or more umbilicals to be introduced into the umbilical gutter;
one or more umbilicals;
providing and operating a loom tool to elastically deform a section of the resilient gutter cover and provide a working clearance, allowing the one or more umbilicals to be removed from the umbilical gutter.

In embodiments, the loom tool is provided above sea level. This allows the attachment of the one or more umbilicals to a drilling riser joint prior to launching the riser joint with the one or more umbilical into the sea, or the removal of the one or more umbilicals from a drilling riser joint after the retrieval of the riser joint with the one or more umbilicals from the sea.

In alternative embodiment, the loom tool is provided on an ROV. This allows the attachment of one or more umbilicals to a riser joint after launching the riser joint and the one or more umbilicals into the sea, or the removal of the one or more umbilicals from a riser joint prior to or during the retrieval of the riser joint and the one or more umbilicals from the sea, or even while the riser joint and possibly a remaining umbilical remain installed in the sea. This is in particular advantageous with umbilicals comprising a synthetic casing, e.g. Dyneema, which provides buoyancy to the umbilical. It prevents an umbilical from immediate sinking down to the bottom once removed from the riser joint by the ROV.

In embodiments, the loom tool is provided stationary, and the umbilicals are accommodated into the umbilical gutter during lowering the marine drilling riser joint. Alternatively, the loom tool is provided movable in a vertical direction, and is hence able to accommodate one or more umbilicals that are provided stationary into the umbilical gutter of an adjacent a stationary drilling riser string. In embodiments, the loom tool is movable in a vertical direction and is able to remove one or more umbilicals from a stationary marine drilling riser string.

The invention is elucidated further in relation to the attached drawings, in which.

Figure 1:
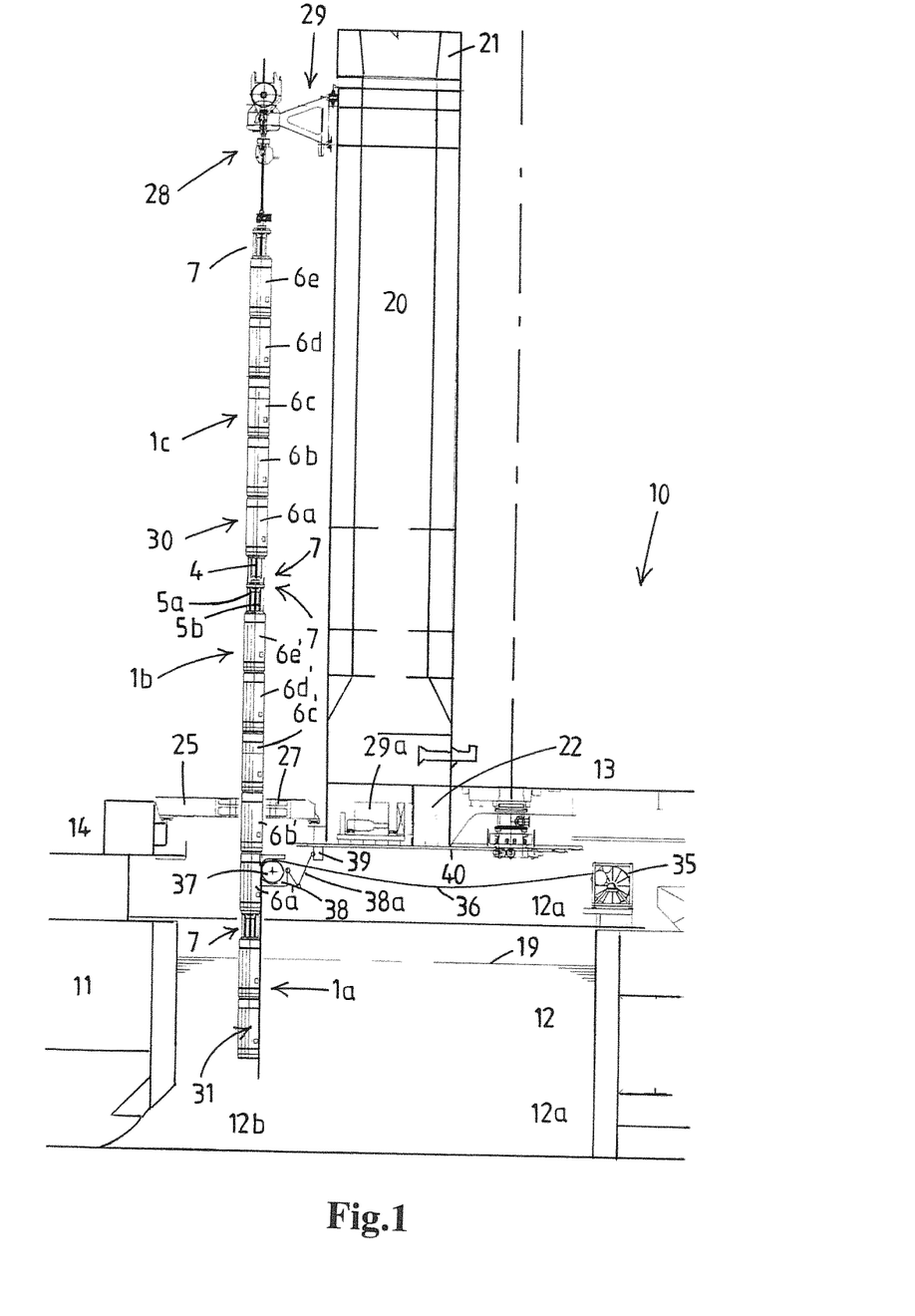
FIG. 1 is a part of a cross section through an offshore drilling vessel according to the invention.

In FIG. 1 part of an offshore drilling vessel 10 is shown, which is adapted to perform subsea wellbore related operations involving the building of a riser string between the subsea wellbore (not shown) and the vessel 10. The vessel may be a mono-hull vessel, but also a catamaran-type vessel or vessel having a different type of hull is also conceivable.

In the shown embodiment, the offshore drilling vessel 10 comprises a hull 11 and a moonpool 12 that extends through the hull 11. It is also conceivable that the subsea wellbore related operations take place from a side or rearside of the hull, and the moonpool may be dispensed with.

The moonpool 12 has, as is preferred, a rectangular shape with opposed lateral sides, a front side and a rear side. A front main deck 13 extends between the moonpool 12 and the front side of the vessel (not shown). A rear main deck 14 extends between the moonpool 12 and the stern of the vessel (not shown). Likewise, the moonpool comprises a rear moonpool area 12b and a front moonpool area 12a.

The vessel is equipped with a tower 20, which is, as is preferred, embodied as a hollow construction mast having a top 21 and having a base 22 that is integral with the hull 11.

At the rear moonpool area, the vessel is provided with a working deck 25 arranged above the rear moonpool area 12b. In view of assembly and disassembly of a riser string 30 along a firing line 31 through the rear moonpool area 12b the vessel is equipped with a riser string assembly hanger 27 that is adapted to suspended therefrom a riser string 30 in the firing line 31 into the sea during the riser assembly and disassembly process. As preferred, this hanger 27 is mounted on the working deck 25, e.g. embodied as a riser spider, e.g. provided with a gimballing support so as to allow for angular variation between the riser string and the working deck, e.g. due to sea motion of the vessel.

The vessel 10 has a riser string handling capacity hoisting device including a riser string lifting tool 28 which is movable up and down relative to the mast 20 and that is adapted to connect to an end of a drilling riser joint, and is embodied to support the weight of a riser string in the firing line 31 when released from the riser string assembly hanger 27.

The riser string lifting tool 28 here is suspended from a travelling hanger device 29 that is movable up and down along the rear side of the mast 20 along one or more vertical rails.

The hanger device 29 is suspended by one or more cables from a sheave arrangement at the top of the mast, which one or more cables are connected to one or more winches 29a, e.g. arranged within the mast 20.

The offshore drilling vessel 10 comprises a number of marine drilling riser joints according to claim 1, which are to be interconnected to build a riser string. Three interconnected marine riser drilling riser joints 1a, 1b and 1c are shown. Each of the shown marine riser joints comprises a centrally provided riser pipe 4, two peripheral lines 5a, 5b extending parallel to the riser pipe and five buoyancy modules 6a, 6b, 6c, 6d, 6e arranged circumferentially around the riser pipe of riser joint 1c. The buoyancy modules of riser joint 1b are labelled 6a', 6b', 6c', 6d', 6e'. Furthermore, connector fitting arrangements 7 are at each end thereof. The umbilical gutter assemblies of the invention are not visible in this overview, but is shown in detail in FIG. 2 as will be elucidated below.

In FIG. 1, furthermore an umbilical reel 35 is visible, provided on the offshore drilling vessel 10, comprising an umbilical 36. The umbilical 36 is unspooled in a horizontal direction towards an umbilical guide reel 37 adjacent the firing line 31 and riser string 30, to change the direction from horizontal to vertical to be lowered with the riser string 30, and according to the invention secured to a riser joint.

A loom tool 38 is provided adjacent the umbilical 36 and the marine drilling riser joint 1a. This is shown in more detail in FIG. 4, in which it is visible that in this embodiment the umbilical guide reel 37 and loom tool 38 are formed integral. In alternative embodiments, the umbilical guide reel and the loom tool are provided as separate components. In FIG. 4, it can be discerned that the loom tool 38 of this embodiment is provided with two cover deformers 38i and 38ii, which are each adapted to deform the resilient gutter cover and provide a working clearance, such as shown in FIG. 3b. It is conceivable that a loom tool comprises a leading cover deformer adapted to open the gutter cover and a trailing cover deformer adapted to close the gutter cover, which differ from one another. On the other hand, a symmetrical loom tool comprising two cover deformers adapted to elastically deform a gutter cover allow the same loom tool to be applied when introducing an umbilical into an umbilical gutter assembly and removing an umbilical from the umbilical gutter assembly.

The loom tool 38 is here provided above water level 19 and below riser string assembly hanger 27. The loom tool 38 is capable of elastically deforming a resilient gutter cover and providing a working clearance allowing the introduction of umbilical 36 into an umbilical gutter provided in buoyance module 6a' of drilling riser joint 1b. Upon lowering the riser string 37, subsequently the umbilical 36 may be introduced into an umbilical gutter provided in buoyance module 6b' of drilling riser joint 1b, etc. etc. As visible adjacent connector fitting arrangement 7 between drilling riser joints 1a and 1b, the umbilical 36 passes the connector fitting arrangement when crossing over from a buoyancy module of one drilling riser joint to a buoyancy module of a subsequent drilling riser joint.

The loom tool 38 and umbilical guide reel 37 are suspended via a flexible arm 38a from a rail-mounted trolley 39, which is horizontally translatable across rails 40 to the opposite side of the moonpool, the front moonpool area 12a.

Figure 2:
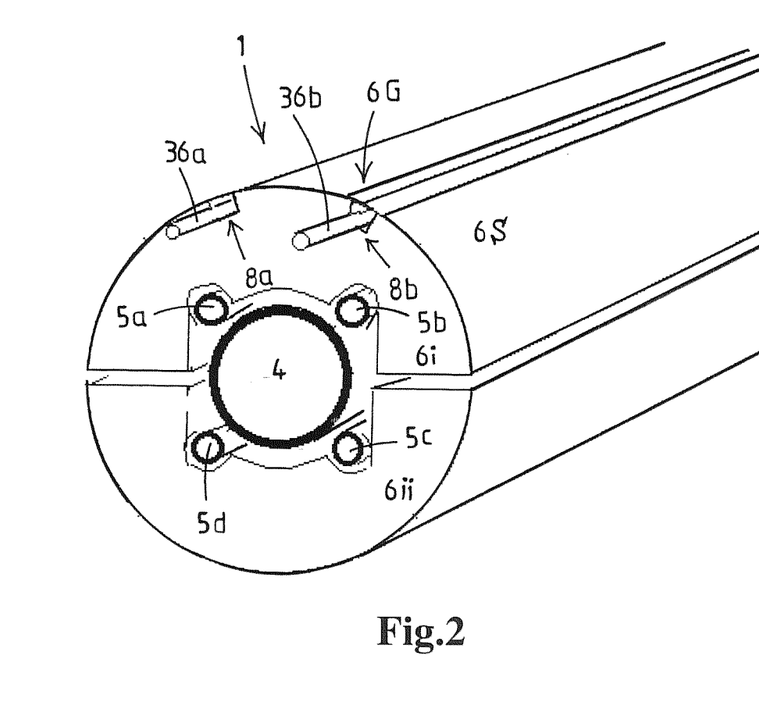
FIG. 2 is a detailed perspective view of a marine drilling riser joint of FIG. 1, provided with two umbilicals.

In FIG. 2 a marine drilling riser joint 1 of FIG. 1 is shown in detail. The shown marine drilling riser joint 1 comprises a riser pipe 4 and four peripheral lines 5a, 5b, 5c, 5d extending parallel to the riser pipe 4. Around the riser pipe and peripheral lines are multiple buoyancy modules arranged, only one of which is visible here. Buoyancy module 6 is arranged circumferentially around the riser pipe 4, and is here composed of two "clamshell" longitudinal half-cylinder buoyancy elements 6i and 6ii that are clamped around the riser pipe 4 and peripheral lines 5a, 5b, 5c and 5d. In the shown embodiment, both buoyancy elements 6i and 6ii are provided with molded-in grooves at the inner surface, recesses and holes to accommodate attachment hardware and auxiliary lines 5a, 5b, 5c and 5d.

Buoyancy element 6i is provided with two grooves 6G at an outer surface 6S, in which two umbilical gutter assemblies 8a, 8b, are provided on the exterior of the marine drilling riser joint 1 and provided parallel to the riser pipe 4. In particular, umbilical gutters 81 are formed integral with the groove 6G. In each gutter assembly 8a, 8b, one umbilical 36a, 36b respectively is accommodated. A connector fitting arrangement at the end of the marine riser joint 1 is not visible.

Figure 3A:
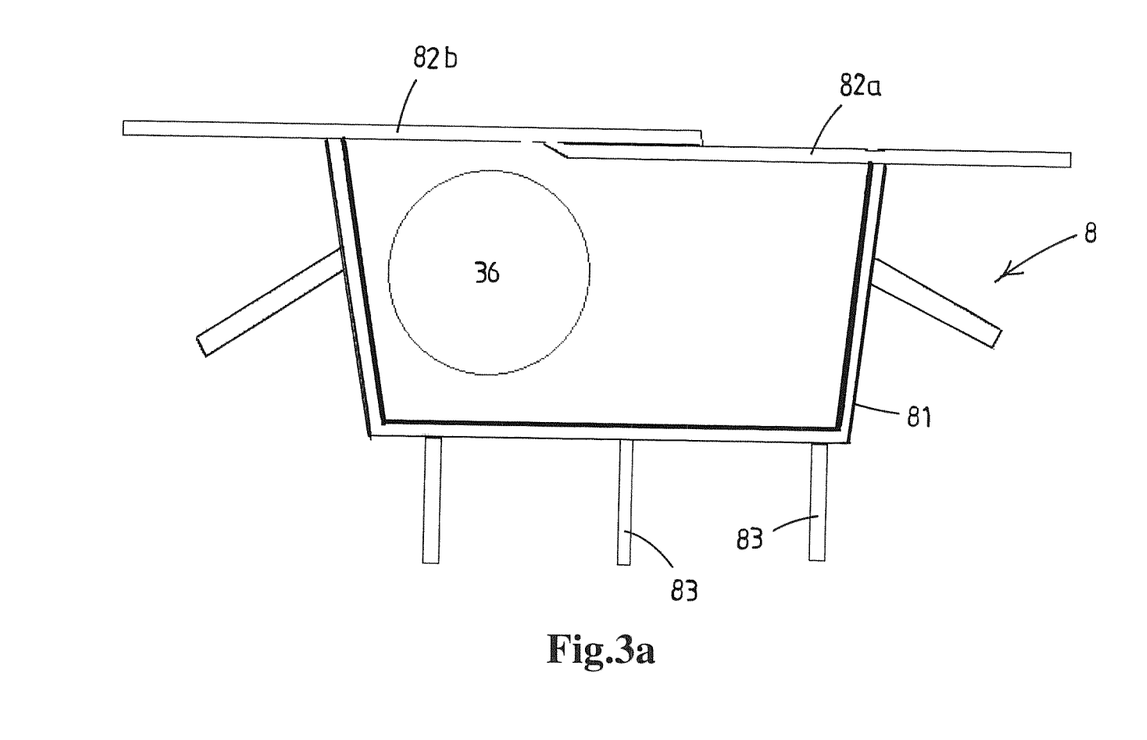
FIG. 3a is a schematic cross section of an umbilical gutter assembly of a riser joint is shown in closed position.
Figure 3B:
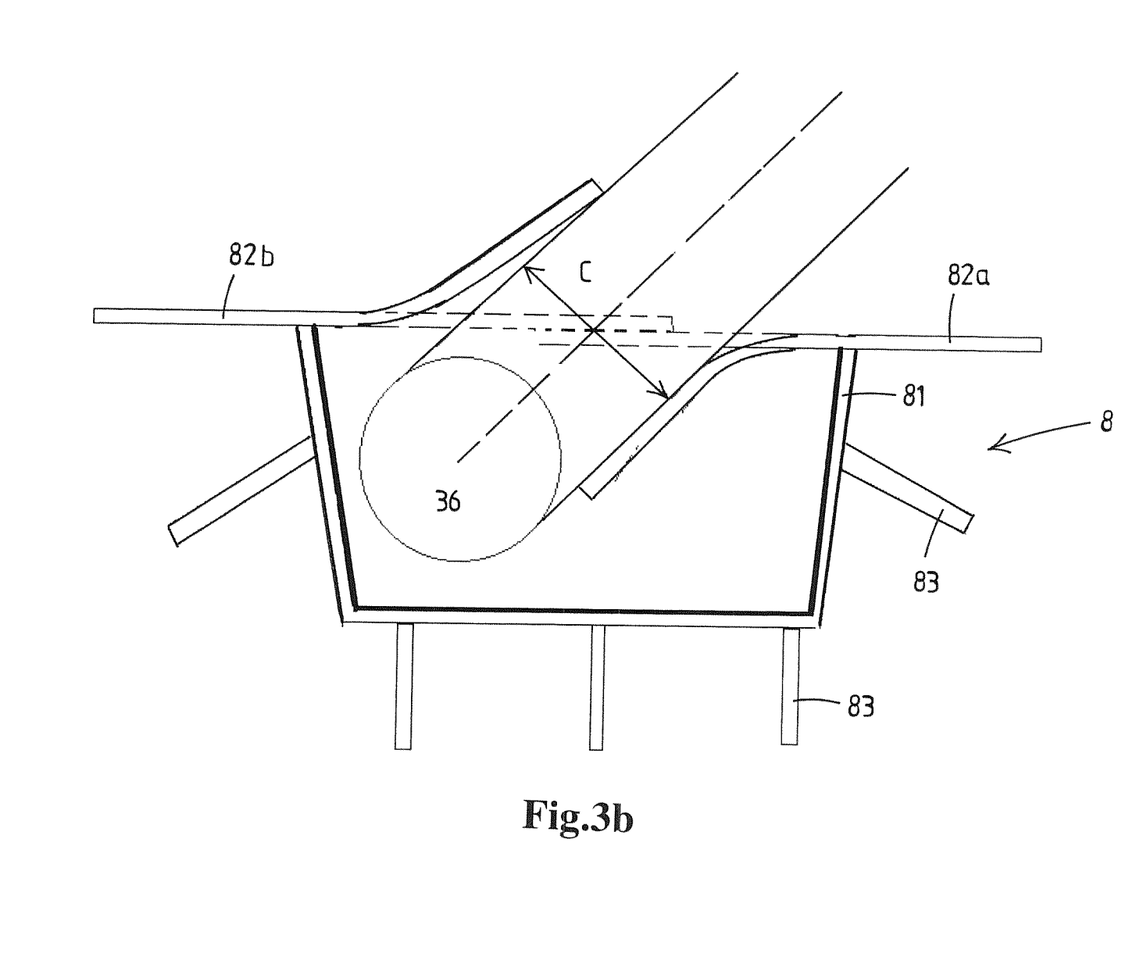
FIG. 3b is a schematic cross section of the umbilical gutter assembly of FIG. 3a in an elastically deformed position.
Figure 4:
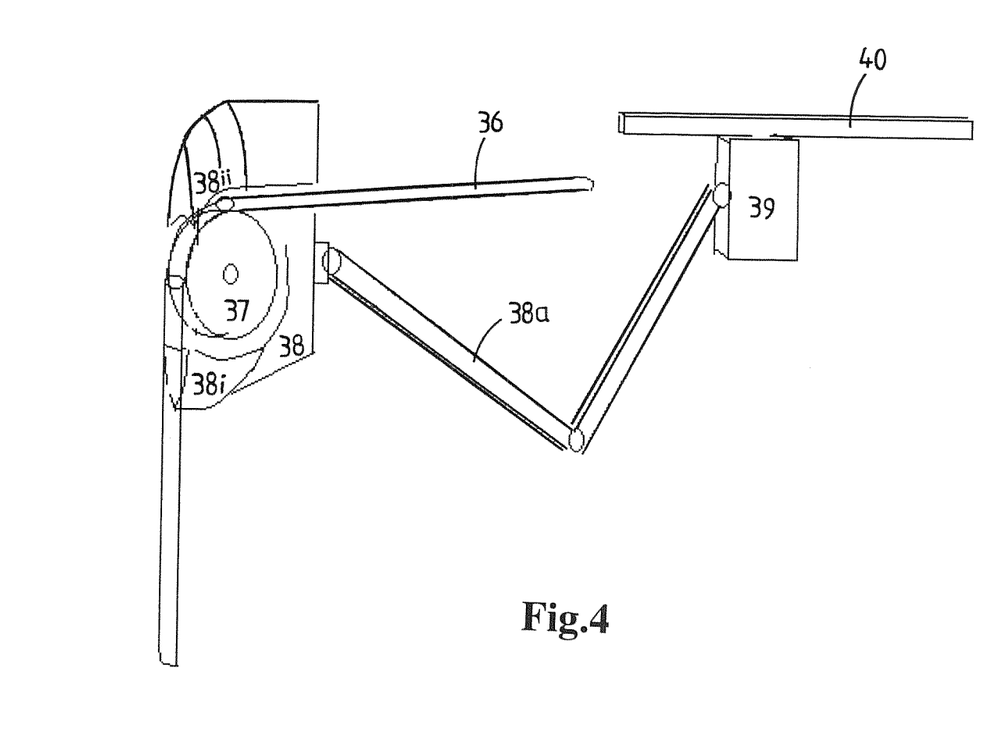
FIG. 4 is a detailed schematic perspective view of a loom tool and umbilical guide reel of the vessel of FIG. 1.

In FIGS. 3a and 3b, an embodiment of an umbilical gutter assembly 8 is shown in detail, possibly the umbilical gutter assembly 8 of FIG. 2. The umbilical gutter assembly 8 comprises an umbilical gutter 81, adapted to accommodate one or more umbilicals. Here, one umbilical 36 is shown. The umbilical gutter assembly 8 furthermore comprises a resilient gutter cover, here composed of overlapping cover portions 82a, 82b, which is elastically deformable by a loom tool, such as loom tool 38 as shown in FIGS. 1 and 4. The resilient gutter cover 82a, 82b comprises two overlapping flaps, overlapping each other above the umbilical gutter. In an alternative, not shown embodiment, the resilient gutter cover is formed integral with the umbilical gutter.

In FIG. 3a, the resilient gutter cover 82a, 82b is shown in a closed position, covering the umbilical gutter 81 and the umbilical 36 provided therein. In the shown embodiment, as visible in FIG. 2, the resilient gutter cover 82a, 82b in the closed position covers the umbilical gutter 81 and is provided flush with the outer surface 6S of the buoyancy module 6. In FIG. 3b, the resilient gutter cover 82a, 82b is shown in an elastically deformed position, in which a working clearance C is provided to allow the one or more umbilicals 36 to be introduced into, or removed from the umbilical gutter 81.

The umbilical gutter 81 of the shown embodiment is provided with one or more anchoring protrusions 83. This allows the umbilical gutter 81 to be molded integral with the buoyancy module, to form an integral element.

The invention claimed is:

1. A combination, comprising:
a marine drilling riser joint, adapted for the securement of one or more umbilicals thereto, the riser joint comprising:
a riser pipe;
one or more peripheral lines extending parallel to the riser pipe;
one or more buoyancy modules arranged circumferentially around the riser pipe; and
connector fitting arrangements at each end thereof,
wherein the marine drilling riser joint further comprises one or more umbilical gutter assemblies, connected to or formed integral in an outer surface of a buoyancy module of the one or more buoyancy modules on the exterior of the marine drilling riser joint and provided parallel to the riser pipe, each of the umbilical gutter assemblies comprising:
an umbilical gutter adapted to accommodate one or more umbilicals; and
a resilient gutter cover, which is elastically deformable by a loom tool, the resilient gutter cover in a closed position covers the umbilical gutter and in an elastically deformed position provides a working clearance to allow the one or more umbilicals to be introduced into the umbilical gutter, and
wherein the combination further comprises a loom tool adapted to elastically deform a section of the resilient gutter cover and provide a working clearance for the one or more umbilicals to be introduced into the umbilical gutter.

2. The combination according to claim 1, wherein the outer surface of the buoyancy module is provided with a groove, parallel to the riser pipe.

3. The combination according to claim 2, wherein at least the umbilical gutter of each of the umbilical gutter assemblies is connected to or formed integral in the groove.

4. The combination according to claim 2, wherein the resilient gutter cover in the closed position covers the groove and is provided flush with the outer surface of the buoyancy module.

5. The combination according to claim 1, wherein the umbilical gutter and/or resilient gutter cover is provided with one or more anchoring protrusions, and wherein the umbilical gutter and/or resilient gutter cover is molded integral with the buoyancy module.

6. The combination according to claim 1, wherein the resilient gutter cover is formed integral with the umbilical gutter.

7. The combination according to claim 1, wherein the resilient gutter cover is composed of overlapping cover portions.

8. An offshore drilling vessel adapted to perform subsea wellbore related operations involving the building of a riser string between the subsea wellbore and the vessel, comprising:
a hull; and
a number of the combinations including marine drilling riser joints according to claim 1, each marine drilling riser joint comprising:
a riser pipe;
one or more peripheral lines extending parallel to the riser pipe;
one or more buoyancy modules arranged circumferentially around the riser pipe;
connector fitting arrangements at each end thereof;
one or more umbilical gutter assemblies, connected to or formed integral in an outer surface of a buoyancy module of the one or more buoyancy modules on the exterior of the marine drilling riser joint and provided parallel to the riser pipe, each of the umbilical gutter assemblies comprising:
an umbilical gutter adapted to accommodate one or more umbilicals; and
a resilient gutter cover, which is elastically deformable by a loom tool, the resilient gutter cover in a closed position covers the umbilical gutter and in an elastically deformed position provides a working clearance to allow the one or more umbilicals to be introduced into the umbilical gutter;
one or more umbilicals; and
a loom tool adapted to elastically deform a section of the resilient gutter cover and provide a working clearance for the one or more umbilicals to be introduced into the umbilical gutter.

9. The offshore drilling vessel according to claim 8, wherein the vessel is provided with a riser handling capacity hoisting device having a riser hanger device, which is adapted to raise and lower a riser string that is suspended from said riser hanger device, wherein the loom tool is provided adjacent the riser hanger device.

10. The offshore drilling vessel according to claim 9, wherein the vessel is provided with an ROV comprising the loom tool.

11. The offshore drilling vessel according to claim 8, wherein the vessel is provided with an ROV comprising the loom tool.

12. A method for attaching one or more umbilicals to a riser joint, comprising the steps of:
providing the marine drilling riser joint according to claim 1, comprising:
a riser pipe;
one or more peripheral lines extending parallel to the riser pipe;
one or more buoyancy modules arranged circumferentially around the riser pipe;
connector fitting arrangements at each end thereof; and
one or more umbilical gutter assemblies, connected to or formed integral in an outer surface of a buoyancy module of the one or more buoyance modules on the exterior of the marine drilling riser joint and provided parallel to the riser pipe, each of the umbilical gutter assemblies comprising:
an umbilical gutter adapted to accommodate one or more umbilicals; and
a resilient gutter cover, which is elastically deformable by a loom tool, the resilient gutter cover in a closed position covers the umbilical gutter and in an elastically deformed position provides a working clearance to allow the one or more umbilicals to be introduced into the umbilical gutter;
providing one or more umbilicals;
lowering the drilling riser joint into the sea;
lowering the one or more umbilicals into the sea; and
providing and operating a loom tool to elastically deform a section of the resilient gutter cover and provide a working clearance, allowing the one or more umbilicals to be introduced into the umbilical gutter.

13. The method according to claim 12, wherein the loom tool is provided above sea level, and wherein the one or more umbilicals are attached to the riser joint prior to launching the riser joint with the one or more umbilicals into the sea.

14. The method according to claim 12, wherein the loom tool is provided on an ROV, and wherein the one or more umbilicals are attached to the riser joint after launching the riser joint and the one or more umbilicals into the sea.

* * * * *